May 24, 1932.  J. HIRTREITER  1,859,299
INTERNAL COMBUSTION ENGINE
Filed Feb. 25, 1929  2 Sheets-Sheet 1

INVENTOR
John Hirtreiter
BY Louis O. French
ATTORNEY

May 24, 1932.　　　J. HIRTREITER　　　1,859,299

INTERNAL COMBUSTION ENGINE

Filed Feb. 25, 1929　　2 Sheets-Sheet 2

INVENTOR
John Hirtreiter
BY
Louis O. French
ATTORNEY

Patented May 24, 1932

1,859,299

UNITED STATES PATENT OFFICE

JOHN HIRTREITER, OF MILWAUKEE, WISCONSIN

INTERNAL COMBUSTION ENGINE

Application filed February 25, 1929. Serial No. 342,389.

The invention relates to internal combustion engines.

It is recognized that the shape of the combustion chamber, the arrangement of the valves and the location of the spark plug or plugs in a constant volume combustible mixture internal combustion engine have a marked effect on combustion and that detonative tendencies may be prevented and so-called "high compression pressures" employed where these factors are given careful consideration. It is the object of this invention to provide a novel form of combustion chamber design which will permit of the use of high compression pressure and will promote efficient combustion without detonative tendencies. More particularly the invention is concerned with the design of a valve in the engine head wherein the charge is subjected to a cooling action during compression over a more extended surface than with engines of the usual type and wherein the spark plug or plugs is or are cooled by its or their location in the path of moving gases.

The invention further consists in the several features hereinafter set forth and more particularly defined by claims at the conclusion hereof.

In the drawings Fig. 1 is a vertical sectional view through an engine embodying the invention, taken on the line 1—1 of Fig. 2;

Figure 1:
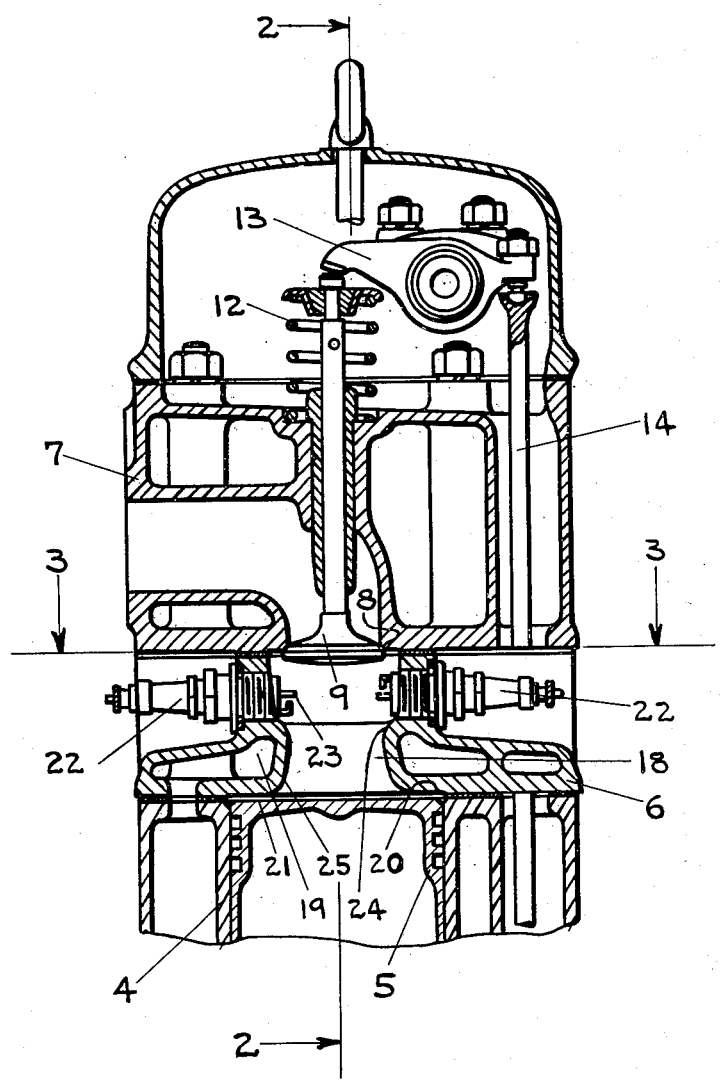
Figure 3:
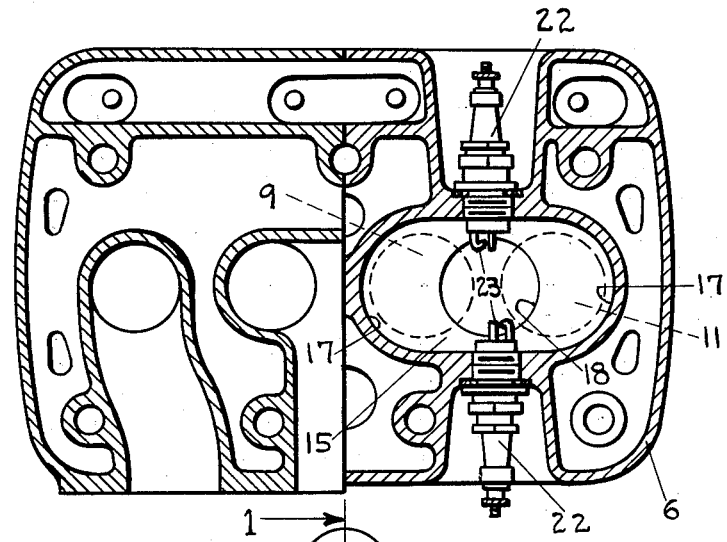
Fig. 3 is a vertical sectional view taken on the line 3—3 of Fig. 1.
Figure 2:
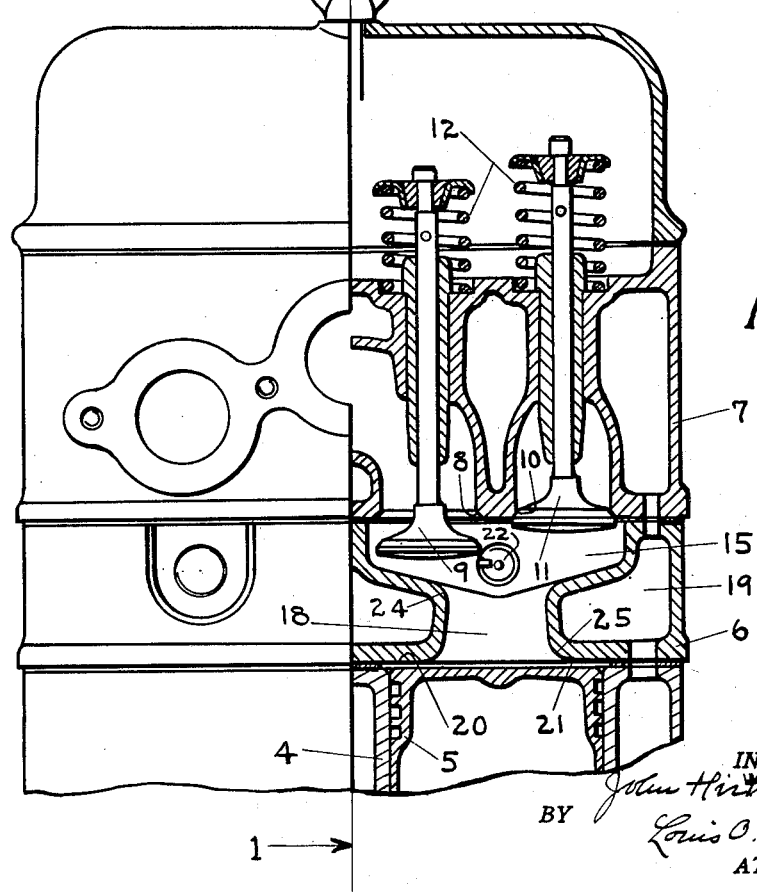
Fig. 2 is a vertical sectional view similar to Fig. 1 taken on the line 2—2 of Fig. 1.

Referring to the drawings the numeral 4 designates the engine cylinder, 5 the piston working therein, 6 and 7 parts of the head which are suitably secured together and to the cylinder.

The part 7 of the head forms the top of the combustion chamber and is provided with an inlet port 8 controlled by a valve 9 and an exhaust port 10 controlled by a valve 11. Both the inlet and exhaust valves are of the poppet type, normally closed by springs 12, and each opened in known manner by tappet levers 13 associated with tappet rods 14 which are actuated in proper cyclic sequence by the usual engine-driven cams (not shown).

The part 6 of the cylinder head is provided with an elongated or relatively narrow combustion space 15 which is of a generally rectangular shape having curved end portions 17, its width being somewhat greater than the valve diameter and its length on centers being somewhat greater than the diameter of the cylinder bore, whereby adequate sized valves may be used and the bridge between the valves may be of a size that can be readily cored. Thus the seats of the valve will be readily cooled and the head will readily withstand the operation temperatures imposed upon it without danger of deformation.

The combustion space 15 communicates with the cylinder bore through a restricted opening or throat 18 whose diameter is preferably somewhat smaller than that of the valves so that the valves are prevented from falling into the cylinder and damaging it or the piston in case the valve springs or keys or the valve heads should break off for any reason. This throat is preferably centrally arranged relative to the space 15 and the cylinder bore and is formed in the part 6. The water-jacket space 19 in the part 6 surrounds the space 15 and the throat.

The lower face 20 of the part 6 forms the top of the cylinder bore and is preferably parallel with the opposing top face of the piston and the clearance space 21 between said face and the piston, when said piston is in its upper dead center position, is reduced to just enough to permit a working clearance.

One or more spark plugs 22 project into the chamber 15 just above the throat 18 with their terminals 23 projecting out over or in line with the wall of the throat, which is preferably flared at its upper end 24, as shown in the drawings. The main portion of the throat is also preferably slightly tapered or flared toward the cylinder space with a further flare or curved edge 25 at its lower end to facilitate the passage of the gases.

Where two spark plugs 22 are used the preferred method is to arrange them opposite each other. In either case the spark plug is disposed centrally of the space 15 and, it will be noted, is arranged as closely as possible to the center of mass of the charge.

With this arrangement, when the inlet valve 9 opens during the suction stroke, the fresh vaporous mixture will be drawn into the combustion space 15 and some of it will pass over the hot exhaust valve and tend to cool the same and because of the throat the suction effect of the piston will rapidly draw any hot residual gases surrounding the exhaust valve through the throat and into the cylinder space along with the new charge and the space 15 and the throat will be filled with substantially fresh mixture by the time the suction stroke is completed. During the compression stroke the gaseous or vaporous mixture is compressed, but because of its contact with the relatively great area of cooled surface afforded by the cooled top of the head part 7, the cooled walls of the space 15, the throat 18 and the top 20, the temperature at the end of the compression is kept down to a point where detonative tendencies of the charge are avoided and ignition can be made to occur at the best time. As the piston nears the top 20 the gases between it and said top are squeezed or forced out of the relatively small clearance space 21 and through the throat 18 which produces a good turbulent action of the gases that assists in their mixing and prevents the formation of local hot zones. At the same time the charge passing through the throat 18 at considerable velocity washes or cleanses the spark plug points 23 of any carbon deposits to prevent short circuiting and at the same time readily removes any residual heat from the same to prevent any chance of hot spot preignition.

As the compression is completed the charge is fired either by one or two plugs and because of its compact form the flame is rapidly propagated throughout the combustion space 15 and throat under constant volume combustion conditions and the subsequent expansion of the charge drives the piston outward or downward on its power stroke and the products of combustion are expelled past the open exhaust valve 11 in the ensuing exhaust stroke. Owing to the restriction, the power delivered to the piston will be uniformly applied as unequal pressure conditions are rapidly equalized in the space 15 before they have a chance to react upon the gases in the cylinder space. Furthermore, any depositions that may form as a result of imperfect combustion during starting will occur in the head part 6 and will not get into the cylinder space proper and cause damage.

It will be noted that by making the cylinder head in two parts the valves may be readily ground by removing the top head 7. Furthermore, the two-part arrangement of the head here shown prevents the development of objectionable casting strains that might occur were said parts formed in one piece.

I desire it to be understood that this invention is not to be limited to any particular form or arrangement of parts except insofar as such limitations are specified in the claims.

What I claim as my invention is:

1. In an internal combustion engine of the four cycle valve-in-the-head type, the combination with the cylinder and the piston working therein, of a cylinder head having an elongated combustion space communicating with said cylinder through a restricted passage of appreciable length, means surrounding said passage for cooling the same to abstract heat from the gases as they flow through said restricted passage, combustible mixture inlet and exhaust valves seating on ports in the walls of said space facing the piston, said piston defining with the bottom of said head a space of substantially minimum clearance at the end of the compression stroke, and a sparking ignition device for said space.

2. In an internal combustion engine of the four cycle valve-in-the-head type, the combination with the cylinder and the piston working therein, of a cylinder head having an elongated space communicating with said cylinder through a centrally disposed restricted passage of substantially cylindrical cross section, means surrounding said passage for cooling the same to abstract heat from said gases as they flow through said restricted passage, combustible mixture inlet and exhaust valves seating on ports in the walls of said space facing the piston, said piston closely approaching the bottom of said head at the end of the compression stroke, and a sparking ignition device projecting into said space adjacent said passage.

3. In an internal combustion engine of the four cycle valve-in-the-head type, the combination with the cylinder and the piston working therein, of a two-part cylinder head, one part of said head having an elongated combustion chamber with rounded ends provided with a cooled passage of substantially cylindrical cross section adapted to abstract heat from the gases on their passage therethrough affording restricted communication with the cylinder space and with a wall portion substantially parallel with the top face of the piston and defining therewith a space of minimum clearance at the end of the compression stroke, the other part of the head forming a wall facing the piston, combustible mixture inlet and exhaust valves seating in ports in said last-named wall, and a sparking ignition device for the combustion chamber.

4. In an internal combustion engine of the four cycle valve-in-the-head type, the combination with the cylinder and the piston working therein, of a cylinder head having an elongated combustion space with rounded ends and of a length somewhat greater than the diameter of the cylinder bore and a passage affording restricted communication between said space and the cylinder, combustible mixture inlet and exhaust valves in the wall of said space facing the piston, the wall of the space adjacent said passage and facing the piston being substantially parallel thereto and defining therewith a space of minimum clearance at the end of the compression stroke, and a sparking ignition device for said combustion space.

5. In an internal combustion engine of the four cycle valve-in-the-head type, the combination with the cylinder and the piston working therein, of a cylinder head having an elongated combustion space with rounded ends and of a length somewhat greater than the diameter of the cylinder bore and a centrally disposed passage affording restricted communication between said space and the cylinder, combustible mixture inlet and exhaust valves in the wall of said space facing the piston, and a sparking ignition device having its terminals disposed substantially in line with a wall of said passage, the wall of the space adjacent said passage and facing the piston being substantially parallel thereto and defining therewith a space of minimum clearance at the end of the compression stroke.

6. In an internal combustion engine of the four cycle valve-in-the-head type, the combination with the cylinder and the piston working therein, of a two part cylinder head, one part of said head having an elongated combustion space with rounded ends and of a length somewhat greater than the diameter of the bore of the cylinder and a centrally disposed passage affording restricted communication between said space and the cylinder, combustible mixture inlet and exhaust valves in the wall of said space facing the piston, said passage flaring outwardly toward the piston, the wall of the space adjacent said passage and facing the piston being substantially parallel thereto and defining therewith a space of minimum clearance at the end of the compression stroke, and a sparking ignition device arranged in said chamber at the entrance of said passage thereto.

7. In an internal combustion engine of the four cycle valve-in-the-head type, the combination with the cylinder and the piston working therein, of a cylinder head having an elongated combustion space and provided with a throat leading into said cylinder, combustible mixture inlet and exhaust valves seating on the ports in the wall of said space facing the piston, the diameter of said throat being somewhat smaller than said valves, and a sparking ignition device in said space for igniting the charge.

8. In an internal combustion engine of the four cycle, valve-in-the-head type, the combination with the cylinder and the piston working therein, of a cylinder head having an elongated combustion space and provided with a throat flaring outwardly toward the piston, combustible mixture inlet and exhaust gas outlet ports in the wall of said space facing the piston, valves controlling said ports, and a sparking ignition device for said space.

9. In an internal combustion engine of the four cycle, valve-in-the-head type, the combination with the cylinder and the piston working therein, of a cylinder head having an elongated combustion space and provided with a throat flaring outwardly toward the piston and having outwardly flaring ends, combustible mixture inlet and exhaust gas outlet ports for said space facing the piston, valves for controlling said ports, and a sparking ignition device for said space.

In testimony whereof, I affix my signature.

JOHN HIRTREITER.